US011376905B2

(12) United States Patent
Westervelt

(10) Patent No.: US 11,376,905 B2
(45) Date of Patent: Jul. 5, 2022

(54) KING PIN ADAPTOR, HITCH ASSEMBLY, AND TOWING SYSTEM

(71) Applicant: N.S.A. RV PRODUCTS, INC., Iola, KS (US)

(72) Inventor: Tod Westervelt, Gas, KS (US)

(*) Notice: Subject to any disclaimer, the term of this patent is extended or adjusted under 35 U.S.C. 154(b) by 159 days.

(21) Appl. No.: 16/864,605

(22) Filed: May 1, 2020

(65) Prior Publication Data

US 2021/0339589 A1  Nov. 4, 2021

(51) Int. Cl.
*B60D 1/06* (2006.01)
*B60D 1/44* (2006.01)
*B60D 1/46* (2006.01)
*B60D 1/52* (2006.01)
*B60D 1/07* (2006.01)

(52) U.S. Cl.
CPC ............. *B60D 1/44* (2013.01); *B60D 1/06* (2013.01); *B60D 1/46* (2013.01); *B60D 1/52* (2013.01); *B60D 1/075* (2013.01)

(58) Field of Classification Search
CPC ............ B60D 1/44; B60D 1/48; B60D 4/488
See application file for complete search history.

(56) References Cited

U.S. PATENT DOCUMENTS

| | | | |
|---|---|---|---|
| 5,513,869 A | 5/1996 | Putnam | |
| 6,050,588 A | 4/2000 | Kissack | |
| 6,158,761 A * | 12/2000 | King | B60D 1/488 |
| | | | 280/495 |
| 6,264,228 B1 | 7/2001 | Westervelt | |
| 6,416,073 B1 | 7/2002 | Marcy | |
| 6,926,125 B1 | 8/2005 | Westervelt | |
| 7,011,327 B2 * | 3/2006 | Colibert | B60D 1/246 |
| | | | 280/901 |
| 7,753,391 B1 | 7/2010 | Hesse et al. | |
| 8,430,418 B2 | 4/2013 | McCoy et al. | |
| 8,439,388 B1 | 5/2013 | Westervelt | |
| 9,199,520 B2 | 12/2015 | Weipert et al. | |
| 9,802,452 B1 | 10/2017 | McCall | |
| 9,919,571 B2 | 3/2018 | Pulliam et al. | |
| 10,486,479 B2 * | 11/2019 | Pulliam | B60D 1/488 |
| 10,589,582 B2 | 3/2020 | Westervelt | |
| 2004/0113390 A1 | 6/2004 | Broussard, III | |
| 2017/0217268 A1 | 8/2017 | Andersen et al. | |
| 2021/0379942 A1 * | 12/2021 | Reese | B60D 1/52 |

* cited by examiner

Primary Examiner — Kevin Hurley

(74) Attorney, Agent, or Firm — Dowell & Dowell, P.C.

(57) ABSTRACT

A king pin adaptor is provided for allowing a king pin, intended to connect to a fifth wheel hitch, to be attachable to a ball hitch assembly. A hitch assembly is provided having a plurality of vertical and longitudinal positions for securing a ball member to allow for greater flexibility in attaching to various towed structures. The king pin adaptor and hitch assembly may be used alone or together as components of a towing system for towing a trailer with a king pin or ball mount.

9 Claims, 9 Drawing Sheets

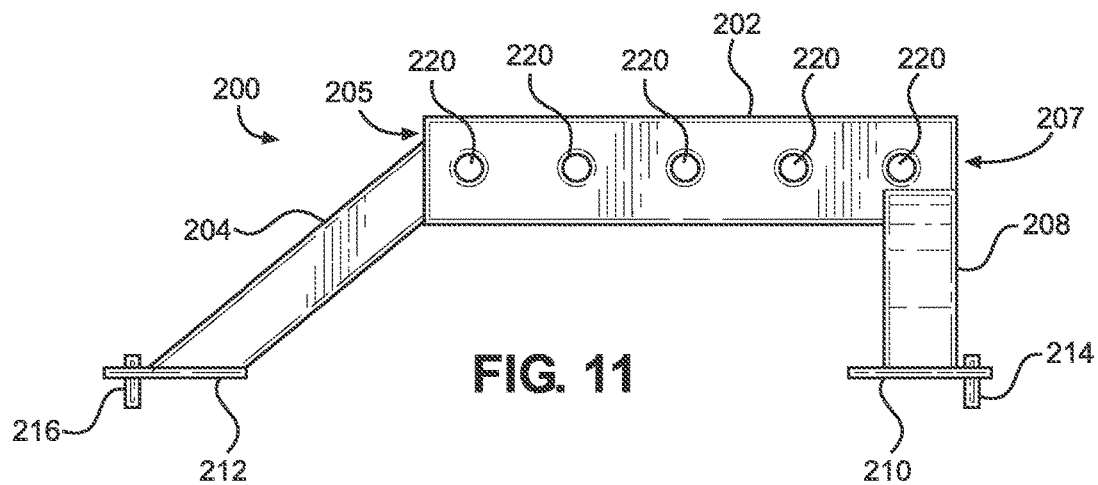
FIG. 11
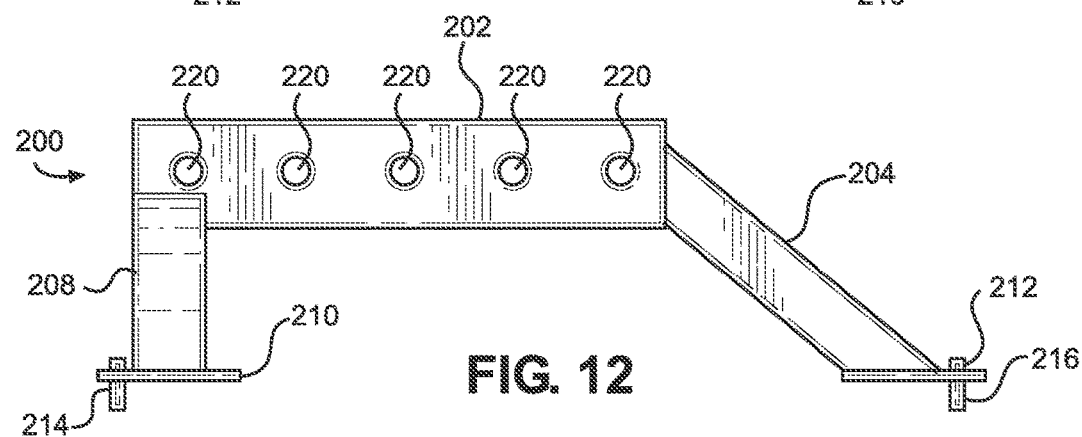
FIG. 12
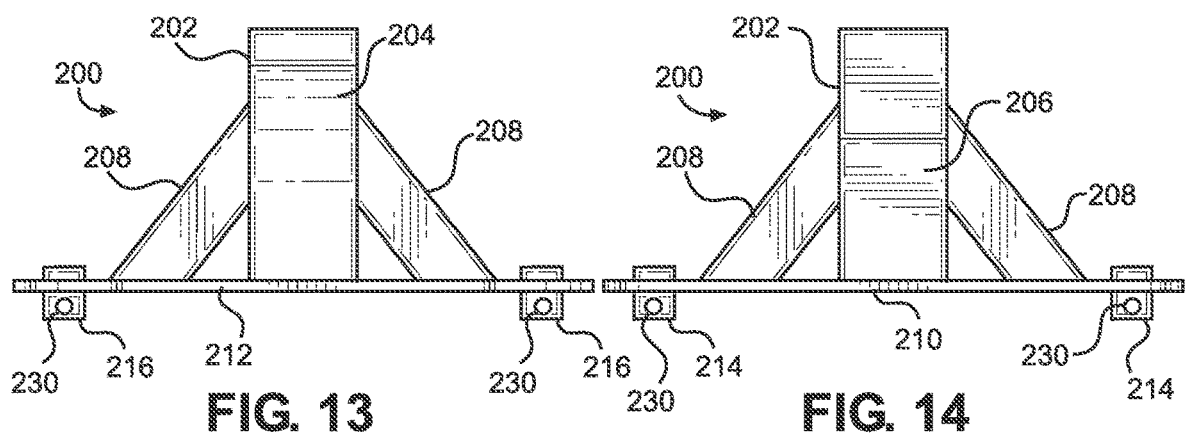
FIG. 13
FIG. 14

KING PIN ADAPTOR, HITCH ASSEMBLY, AND TOWING SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

PARTIES TO A JOINT RESEARCH AGREEMENT

Not Applicable.

REFERENCE TO SEQUENCE LISTING

Not Applicable.

STATEMENT REGARDING PRIOR DISCLOSURES BY THE INVENTOR OR A JOINT INVENTOR

The inventor has made no prior disclosures regarding the present invention. The inventor has disclosed other inventions, notably as provided in U.S. Pat. Nos. 6,264,228; 6,926,125; 8,439,388; and 10,589,582 which include a Hitch Assembly For Activating a Towed Vehicle's Brakes, Premature Activation Stop For Towed Vehicle Cable Braking Systems, a Universally Pivotal Tow Bar Assembly, and a Pivotal Tow Bar Assembly. None of the referenced patents disclose the instant invention.

BACKGROUND OF THE INVENTION

The present invention pertains to the field of towing systems for vehicles, specifically land vehicles towing trailers or similar structures having a king pin.

The instant disclosure is directed to a king pin adaptor and a hitch assembly, alone and in combination to form a towing system, for use in towing a trailer or similar structure. The king pin adaptor is shaped to allow a trailer having a king pin to securely engage a ball of a ball and hitch assembly. The hitch assembly of the present invention provides such a ball, and further allows the ball to be positioned along multiple longitudinal and vertical positions relative to the hitch assembly. The king pin adaptor may be used separately or may be used together with the hitch assembly to provide a full towing system for towing a trailer, recreational vehicle (RV), or similar structure having a king pin behind a land vehicle, preferably a truck.

A typical fifth wheel hitch includes a channel for the king pin to slide horizontally into and be secured within. The king pin is a, typically, 2 or 3½ inch-diameter (50.8 or 88.9 mm) vertical steel pin protruding from a bottom surface positioned near a front of a trailer. As a connected truck turns, the downward-facing surface of the semi-trailer (with the kingpin at the center) rotates against the upward-facing surface of the fixed fifth wheel hitch, which does not typically move relative to the truck. To reduce friction, grease is applied to the surface of the fifth wheel. The fifth wheel hitch is secured to a truck and allows the trailer to rotate radially via the king pin.

However, the kingpin and fifth wheel hitch is not inherently interchangeable with a ball and hitch towing system. Further, the kingpin and fifth wheel hitch assembly combination does not permit a wide range of movement between the truck and trailer up or down in either vertical direction. The instant invention provides a king pin adaptor and a hitch that allows a ball and hitch system to be used with a trailer having a king pin.

BRIEF SUMMARY OF THE INVENTION

An object of the instant invention is to teach a king pin adaptor comprising a housing having an opening along a face of the housing, the opening connecting the face to an inner chamber within the housing, and a cutout section having a perpendicularly oriented vertical face and horizontal face, the vertical face having a groove; a plate having a matching groove along a vertical face, the plate securable along the perpendicularly oriented vertical face and horizontal face of the housing such that the groove of the housing and the matching groove of the plate form a cylindrical chamber with at least two different diameters, wherein an opening is formed along an opposing face of the housing between the housing and the plate when the plate is secured to the housing; and a security pin positioned along the opening and movable between at least two positions in the opening by a handle.

A further object is to teach the king pin adaptor further comprising an opening through each opposing end of the plate; an opening through each opposing end of the vertical face of the cutout section; and a fastener, wherein each opening of the plate matches a corresponding opening of the cutout section when the plate and housing are secured together, such that the fastener is insertable through each corresponding opening of the plate and housing to secure the plate and housing together.

Another object of the present invention is to teach a hitch assembly, comprising an elongated body having a plurality of cylindrical chambers spaced longitudinally along the body, each chamber open along a top surface of the body, and a pair of corresponding pin holes laterally bisecting the body through each cylindrical chamber; at least one front leg secured to a front end of the body; and at least one back leg secured to a back end of the body, wherein the at least one front leg and at least one back leg are securable to a vehicle.

A further object is to teach the hitch assembly further comprising a ball member having a cylindrical stabilizer portion and a spherical connector portion connected vertically by a grooved segment, wherein the cylindrical stabilizer portion has a plurality of vertically spaced horizontal channels, each horizontal channel laterally bisecting the cylindrical stabilizer portion.

A further object is to teach the hitch assembly, wherein the ball member is removably securable with each cylindrical chamber of the body along the cylindrical stabilizer portion.

A further object is to teach the hitch assembly, further comprising a pin configured to be removably insertable through the pair of corresponding pin holes laterally bisecting the body and any of the plurality of vertically spaced horizontal channels, thereby removably securing the ball member along multiple vertical and horizontal positions relative to the body.

Another object of the present invention is to teach a towing system, comprising a king pin adaptor, the king pin adaptor comprising:

a housing having an opening along a face of the housing, the opening connecting the face to an inner chamber within the housing, and a cutout section having a perpendicularly oriented vertical face and horizontal face, the vertical face having a groove; a plate having a matching groove along a vertical face, the plate securable along the perpendicularly oriented vertical face and horizontal face of the housing such that the groove of the housing and the matching groove of the plate form a cylindrical chamber with at least two different diameters, wherein an opening is formed along an opposing face of the housing between the housing and the plate when the plate is secured to the housing; and a security pin positioned along the opening and movable between at least two positions in the opening by a handle;

a hitch assembly, the hitch assembly comprising:

an elongated body having a plurality of cylindrical chambers spaced longitudinally along the body, each chamber open along a top surface of the body, and a pair of corresponding pin holes laterally bisecting the body through each cylindrical chamber; a pair of front legs secured to a front end of the body; and a pair of back legs secured to a back end of the body, wherein the pair of front legs and pair of back legs are securable to a vehicle; and a ball member having a cylindrical stabilizer portion and a spherical connector portion connected vertically by a grooved segment, wherein the cylindrical stabilizer portion has a plurality of vertically spaced horizontal channels, each horizontal channel laterally bisecting the cylindrical stabilizer portion.

A further object is to teach the towing system comprising a pin configured to be removably insertable through the pair of corresponding pin holes laterally bisecting the body and any of the plurality of vertically spaced horizontal channels, thereby removably securing the ball member along multiple vertical and horizontal positions relative to the body.

The instant invention will be better understood with reference to the following set of drawings.

BRIEF DESCRIPTION OF THE SEVERAL VIEWS OF THE DRAWINGS

FIG. 11 is a side view of the hitch assembly of FIG. 10;

FIG. 12 is an opposite side view of the hitch assembly of FIG. 10;

FIG. 13 is a front view of the hitch assembly of FIG. 10;

FIG. 14 is a back view of the hitch assembly of FIG. 10;

Figures 1, 2:
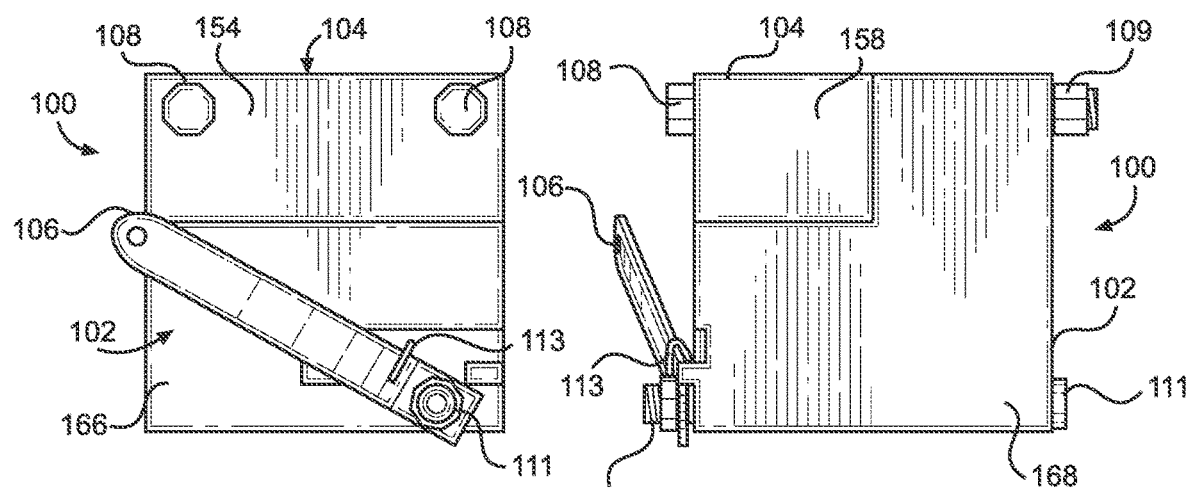
FIG. 1 is front view of a king pin adaptor according to an embodiment of the invention.
FIG. 2 is a side view of the king pin adaptor of FIG. 1.

The instant invention will be further understood with reference to the following detailed description.

DETAILED DESCRIPTION OF THE INVENTION

A preferred embodiment of a king pin adaptor 100 is shown in multiple views throughout FIGS. 1-9B. The preferred embodiment of the king pin adaptor 100 includes a housing 102, a plate 104, fasteners 108 and 109 for securing the plate and housing together, a handle 106, and a spring 113.

Figures 3, 4:
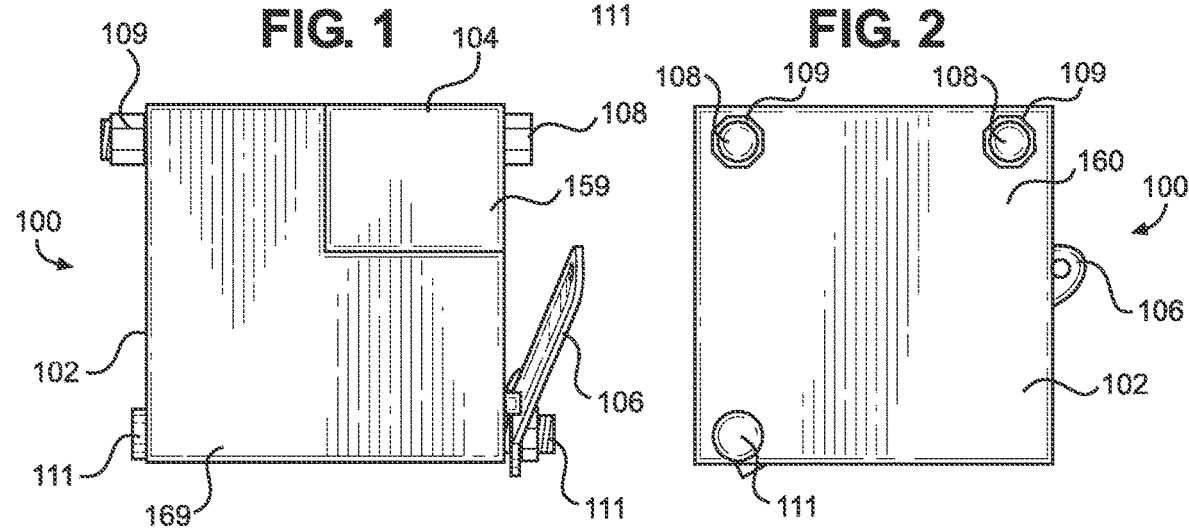
FIG. 3 is a side view of the king pin adaptor opposite from the side view shown in FIG. 2.
FIG. 4 is a back view of the king pin adaptor of FIG. 1.

FIGS. 1-6 provide views of the king pin adaptor 100 along six different surfaces 160, 162, 164, 166, 168, and 169 of the housing 102. FIG. 1 provides a view of the king pin adaptor 100 along a front surface 166. FIG. 2 shows a side of the king pin adaptor 100 including a side surface 158 of the plate 104 and a side surface 168 of the housing 102. FIG. 3 shows a side of the king pin adaptor opposite to the side shown in FIG. 2. This side includes a side surface 159 of the plate 104 and a side surface 169 of the housing 102.

Figure 7:
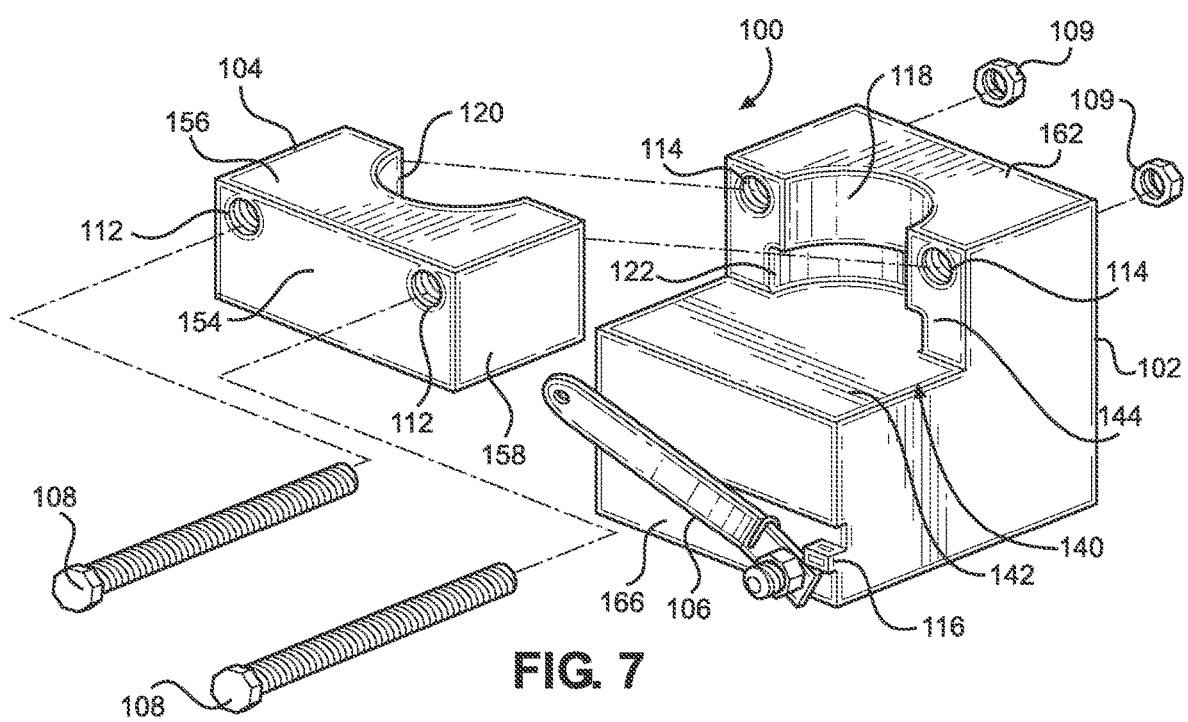
FIG. 7 is an exploded perspective view of the king pin adaptor of FIG. 1.

The housing 102 includes a cutout section 140 having a vertical surface 144 and a horizontal surface 142. The cutout section 140 is best shown in FIG. 7. The vertical surface 144 and horizontal surface 142 are perpendicular to each other in the preferred embodiment. A length and width of each of the vertical surface 144 and horizontal surface 142 match a length and width of corresponding vertical and horizontal surfaces 150 and 152, respectively, of the plate 104. When the plate 104 is secured to the housing 102 in the cutout section 140, each outer surface of the king pin adaptor 100 forms a quadrilateral.

The vertical surface 144 of the cutout section 140 includes a semi-circular recess or groove 118 and a second semi-circular recess or groove 122. The recess 118 is positioned above, and adjacent to, the second recess 122. The recess 118 shares an edge with and is adjacent to an upper outer surface 162 of the housing 102, while recess 122 is adjacent to the horizontal surface 142. Recess 118 has a smaller diameter than the second recess 122, measured from the respective edges of the recesses 118, 122 along a plane defined by vertical surface 144.

An opening or through-hole 114 extends from the vertical surface 144 through the housing 102 to an opposing outer surface 160, shown in FIG. 4. The opening 114 is positioned on either side of the recesses 118, 122 in the preferred embodiment. An interior surface of each opening 114 may be threaded to receive a threaded fastener 108.

Figures 5, 6:
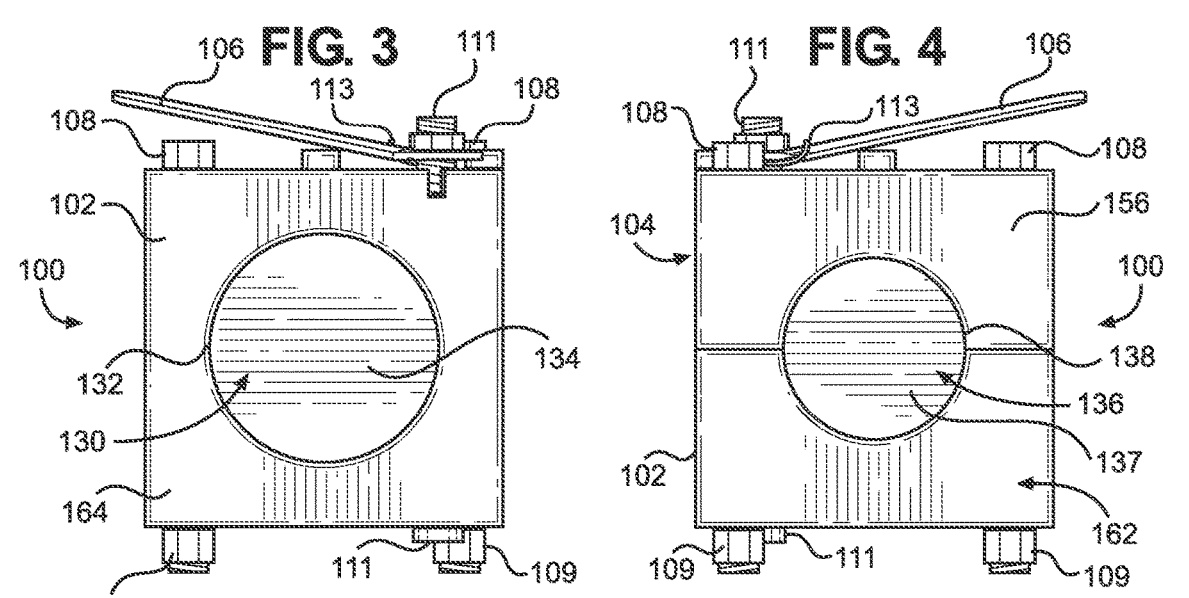
FIG. 5. is a bottom view of the king pin adaptor of FIG. 1.
FIG. 6 is a top view of the king pin adaptor of FIG. 1.

An opening 132 along a bottom outer surface 164 of the housing leads into an inner chamber 130, as shown in FIG. 5. The opening 132 and inner chamber 130 are positioned opposite the grooves 118 and 122. The opening 132 is circular to accept at least a head portion of a ball member 300. A back surface 134 of the inner chamber 130 is preferably semi-circular to allow the ball member 300 to easily pivot within the inner chamber 130 along the back surface relative to the housing when secured therein. The inner chamber 130 is preferably shaped to allow a maximum amount of rotation between the king pin adaptor 100 and ball member 300, while minimizing space between the back surface 134 and ball member to prevent shaking or rattling within the inner chamber.

Figures 9A, 9B:
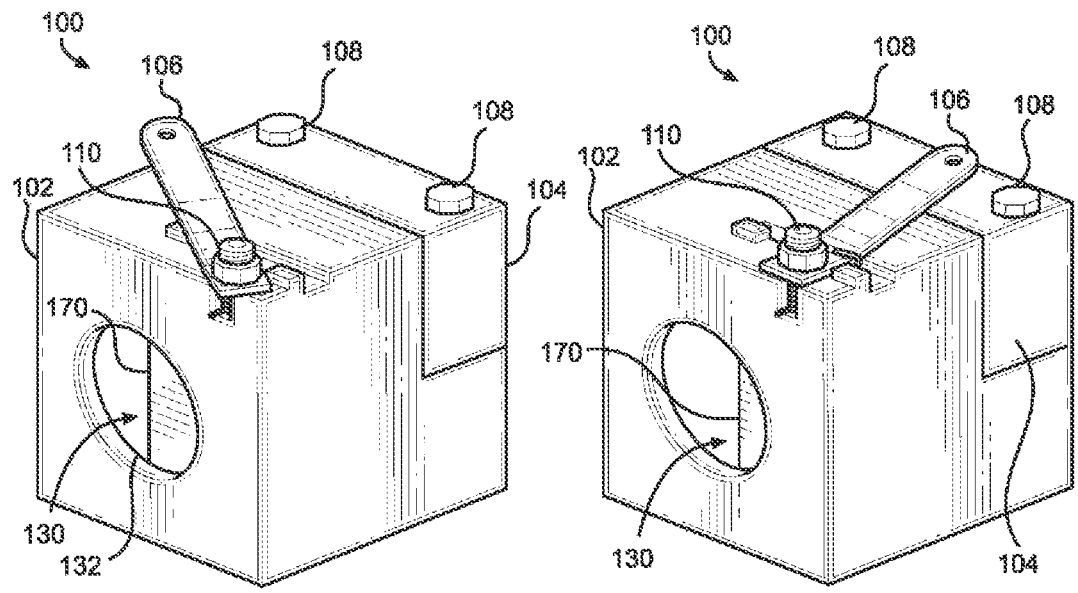
FIG. 9A is a bottom view of the king pin adaptor with the securing pin and handle in an open position.
FIG. 9B is a bottom view of the king pin adaptor with the securing pin and handle in a closed position.
Figure 10:
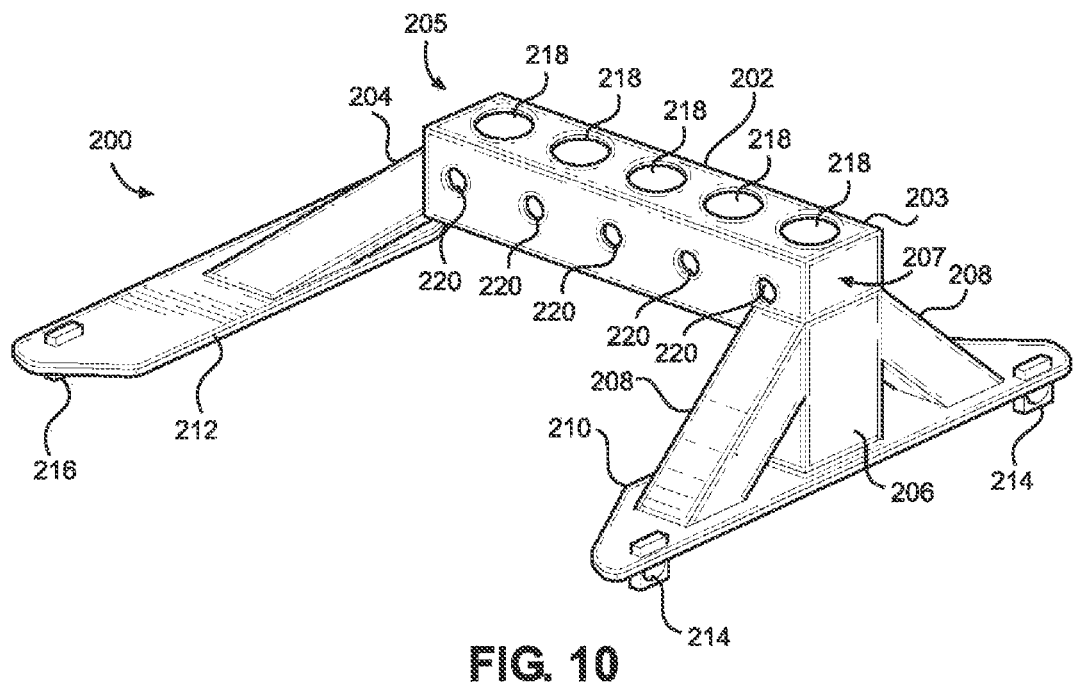
FIG. 10 is a perspective view of a hitch assembly according to an embodiment of the instant invention.
Figure 15:
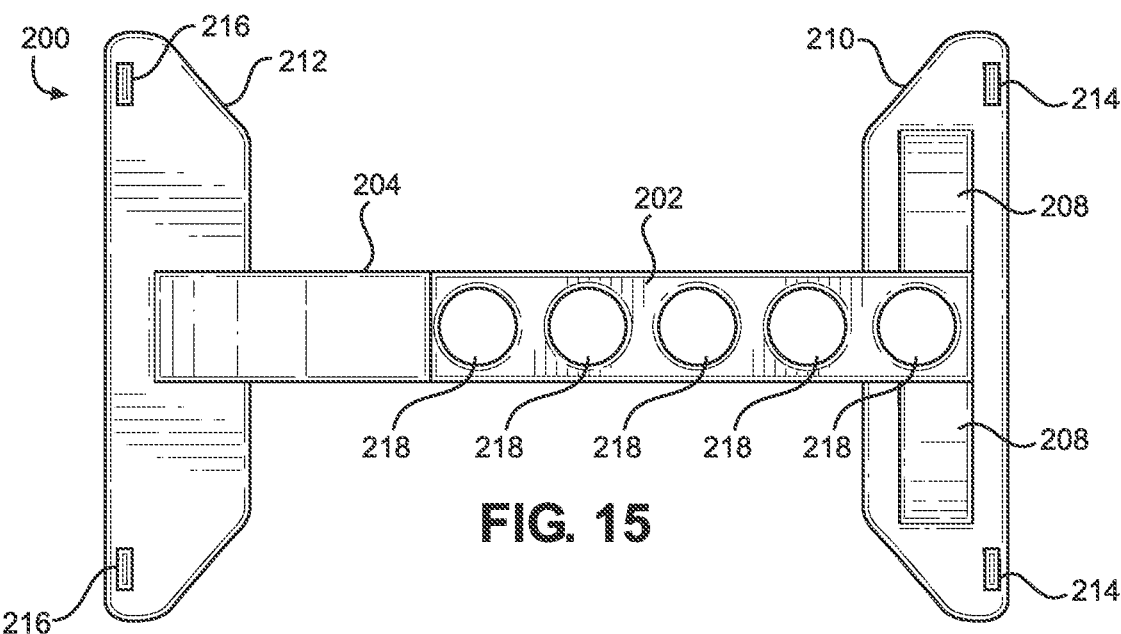
FIG. 15 is a top view of the hitch assembly of FIG. 10.

The handle 106 is operably attached to a pin 111 along the front surface 166 of the housing 102. The pin 111 is inserted through a cylindrical opening extending through the housing 102 between opposing surfaces 160 and 166. A spring 113 is secured coaxially around the pin 111 between the handle 106 and housing 102. The spring 113 is further secured to the handle 106, such that the spring compresses and expands in corresponding rotation of the handle about the pin 111. The handle 106 is positioned in a default position, or closed position, with the spring 113 expanded, as shown in FIG. 9A. When in the default position, the pin 111 secures a plate, fastener, or similar member 170 within opening 132 of inner chamber 130 to prevent removal of the ball member 300 from the inner chamber. In an open position, shown in FIG. 9B, the handle 106 is rotated such that spring 113 is compressed. Rotation of the handle 106 causes corresponding rotation of the pin 111 and retraction of the plate, fastener, or similar member 170 from the opening 132 to allow insertion or removal of the ball member 300 into or out of the inner chamber 130. Thus, the pin 111 is operably connected to the plate, fastener, or similar member 170. The spring 113 is attached to the handle 106 in such a way that the handle will automatically rotate back to the default position without an external application of force to keep the handle in the open position, as the compressed spring in the open position with expand back to the default position, causing the handle to rotate.

Figure 8A:
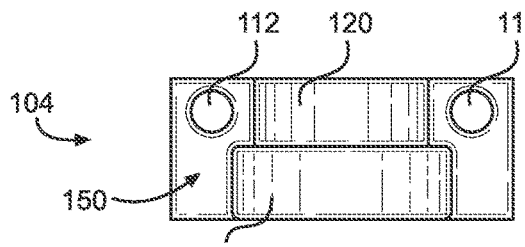
FIG. 8A is a back view of an adaptor plate of the king pin adaptor of FIG. 1.
Figure 8B:
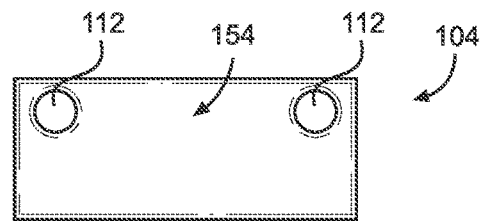
FIG. 8B is a front view of the adaptor plate of FIG. 8A.
Figure 8C:
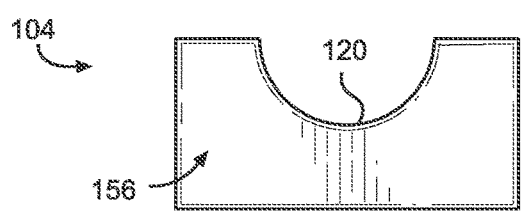
FIG. 8C is a bottom view of the adaptor plate of FIG. 8A.
Figure 8D:
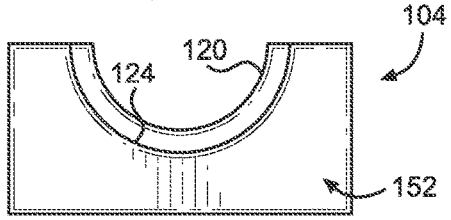
FIG. 8D is a top view of the adaptor plate of FIG. 8A.

The plate 104 is shown along six different surfaces in FIGS. 8A-8F. A vertical surface 150 matching the vertical surface 144 is shown in FIG. 8A. The plate 104 includes a semi-circular recess or groove 120 and a second semi-circular recess or groove 124, which match groove 118 and groove 122, respectively, such that grooves 118 and 120 form a cylindrical space and grooves 122 and 124 form a larger cylindrical space when the plate 104 is secured to the housing 102 within the cutout section 140. These cylindrical spaces correspond to a free end of a king pin. Likewise, an opening or through-hole 112 extends from the vertical surface 150 through the plate 104 to an opposing outer surface 154 on either side of the grooves 120 and 124. FIG. 8B shows the opposing, or back, surface 154. FIGS. 8C and 8D show views of the plate 104 along a top surface 156 and a bottom surface 152, respectively. When the plate 104 is secured to the housing 102, surface 156 of the plate and surface 162 if the housing 102 form an upper surface of the king pin adaptor 100, which will be positioned adjacent to a structure securing a king pin, such as a trailer.

Each through-hole 112 of the plate 102 matches a corresponding through-hole 114 of the housing 102, and may likewise be threaded to accept a threaded fastener.

Figure 8E:
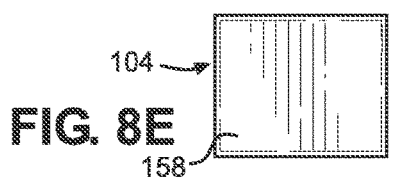
FIG. 8E is a side view of the adaptor plate of FIG. 8A.
Figure 8F:
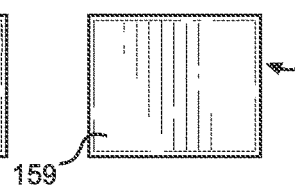
FIG. 8F is an opposite side view of the adaptor plate of FIG. 8A.

FIGS. 8E and 8F show plate 104 side surfaces 158 and 159, respectively.

FIG. 7 shows an exploded view of the king pin adaptor 100, including the housing 102, the plate 104, and fasteners 108, 109. As shown, the plate 104 fits within the cutout section 140 of the housing 102. The vertical surface 150 of the plate 104 matches and is secured against the vertical surface 144 of the housing 102. The vertical surfaces are secured together by a fastener, in this case a bolt 108, inserted through each corresponding pair of through-holes 112 and 114 of the plate 102 and housing 104, respectively. A nut 109 secures and prevents each bolt 109 from being removed from corresponding through-holes 112 and 114. The horizontal surface 152 of the plate is positioned adjacent to horizontal surface 142 of the housing 102.

Upon being secured together, the plate 104 and housing 102 form a circular opening 138 between surfaces 156 and 162, as seen in FIG. 6. An upper chamber 136 is also formed, in which a king pin is securable. A portion of the horizontal surface 142 of the housing forms a bottom surface 137 of the upper chamber 136, defined within a circumference of grooves 122 and 124.

Preferably, opening 138, the cylindrical spaces formed by grooves 118, 120 and 122, 124, and opening 132 are coaxial. Further, it is preferable that the ball member 300 and the king pin are initially coaxial when secured, assuming that both the vehicle and towed structure are both on a 180° flat surface. Further, it is preferable for a central longitudinal axis passing through the king pin to pass through a center of the spherical head of the ball member, even as the king pin adaptor 100 rotates about the ball member. It is also preferable to minimize the distance within the king pin adaptor between the spherical head of the ball member and the king pin. This positioning promotes maximum freedom of movement about a pivot point between the king pin adaptor 100 and ball member 300.

While the preferred embodiment of the plate 102 and housing 104 shows a generally quadrilateral king pin adaptor, it should be understood that the overall shape of the king pin adaptor 100 need not be a quadrilateral.

A preferred embodiment of a hitch assembly 200 is shown from multiple angles in FIGS. 10-16. The hitch assembly 200 includes an elongated body 202 having a plurality of cylindrical chambers 218 spaced longitudinally along the body. Each chamber 218 is open along a top surface 203 of the body 202 and extends downwardly within the body. Each chamber 218 also has a pair of corresponding pin holes 220 laterally bisecting the body 202 through each chamber. Each pin hole 220 is sized to allow a pin, or similar fastener, to insert through the body 202 and a corresponding chamber 218. At least one front leg 204 is secured to a front end 205 of the body 202 and extends downwardly to an elongated plate 212 positioned perpendicularly to the body. At least one back leg 206 is secured to a back end 207 of the body 202 and extends downwardly to another elongated plate 210 positioned perpendicularly to the body. A pair of brace members 208 are preferably positioned between the body 202 and plate 210, one brace on either side of the body, such that a triangular structure is formed between each brace member, the back leg 206, and plate. Each plate 210 and 212 is securable to a vehicle or towing structure by a one or more connection members 214 or 216, respectively, extending downwardly from each respective plate.

In the preferred embodiment, the body 202 includes five cylindrical chambers 218 evenly spaced along the length of the body, each of the five chambers having a pair of corresponding pin holes 220 positioned such that a pin 402 may be inserted through a midpoint of a diameter of the ball member 300 to secure the ball member within a cylindrical chamber at to the hitch assembly 200. A diameter of each cylindrical chamber 218 preferably matches or slightly exceeds a diameter of the ball member 300 such that the ball member securely fits within the cylindrical chamber with minimal later movement.

In the preferred embodiment of the hitch assembly 200, the front leg 204 is angled relative to the plate 212 and body 202, while the back leg 206 is perpendicular relative to the plate 210 and body. In other embodiments of the hitch assembly, the front leg may similarly be perpendicular to the plate 212 and body 202 and/or the back leg may be angled relative to the plate 210 and body.

Brace members, similar to brace members 208, may be included along a front end 205 of the body 202 between the body and plate 212. Such brace members are structurally more useful when the front leg 204 is perpendicularly attached to plate 212 and body 202.

Plates 210 and 212 are trapezoidal in shape with rounded edges. The plates 210, 212 may each be different shapes besides trapezoidal, and both plates 210, 212 need not be the same shape. For manufacturing purposes, it is more efficient to have the plates 210, 212 be similarly shaped. The plates 210, 212 provide connection points between the hitch assembly 200 and, typically, an automotive vehicle. In the preferred embodiment, such connection points are connection members 214 or 216 extending vertically downward from plates 210 and 212, respectively, each member 214, 216 having a horizontally positioned opening 230 for a fastener to pass through.

Figure 16:
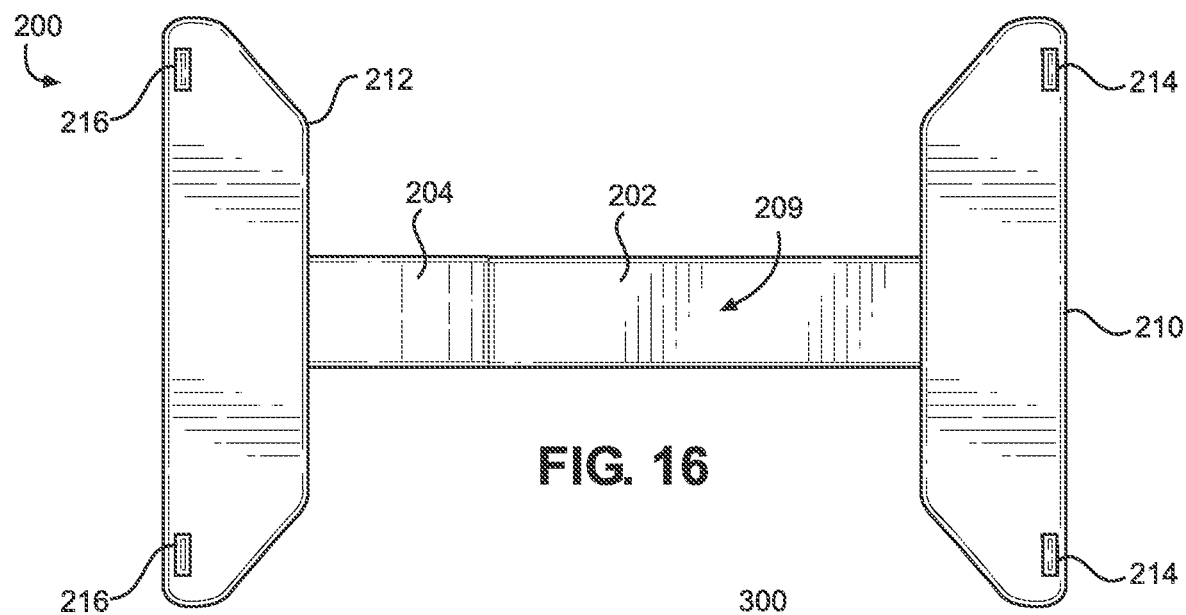
FIG. 16 is a bottom view of the hitch assembly of FIG. 10.

As seen in FIG. 16, there are no openings along a bottom surface 209 of the body 202. The cylindrical chambers 218 to not extend through the body 202, but only partially extend downwardly into the body. By providing a bottom surface in each cylindrical chamber 218, the ball member 300 may be supported in case the pin 402 becomes dislodged or removed from the pin holes 220 and ball member.

Figure 17:
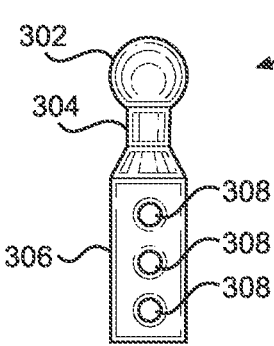
FIG. 17 is a ball according to an embodiment of the instant invention.

A preferred embodiment of the ball member 300 is shown in FIG. 17. The ball member 300 includes a spherical head 302 vertically attached to and supported by a neck 304, which in turn is vertically attached to a cylindrical body 306. The head 302 is spherical to provide a rotational surface for the king pin adaptor 100 or another structure capable of attaching to a ball hitch.

The neck 304 has a small diameter than either the head 302 or body 306 to allow the head to be secured within the chamber 130 by the plate, fastener, or similar member 170. In the default, closed position the plate, fastener, or similar member 170 reduces the effective diameter of the opening 132, preventing the head 302 from being removed from the inner chamber 130. The plate, fastener, or similar member 170 rests against or adjacent to the neck 304 in the default, closed position of the king pin adaptor 100.

The body 306 includes multiple openings 308 for the pin 402 to be inserted through to bisect the ball member 300. The openings 308 are positioned vertically relative to each other along a height of the body 308. This allows the ball member 300 to be positioned at different heights relative to the hitch assembly 200. Along with the multiple cylindrical chambers 218, the openings 308 along the body 306 provide multiple vertical and horizontal positions for the ball member 300 relative to the hitch assembly 200.

Figure 18:
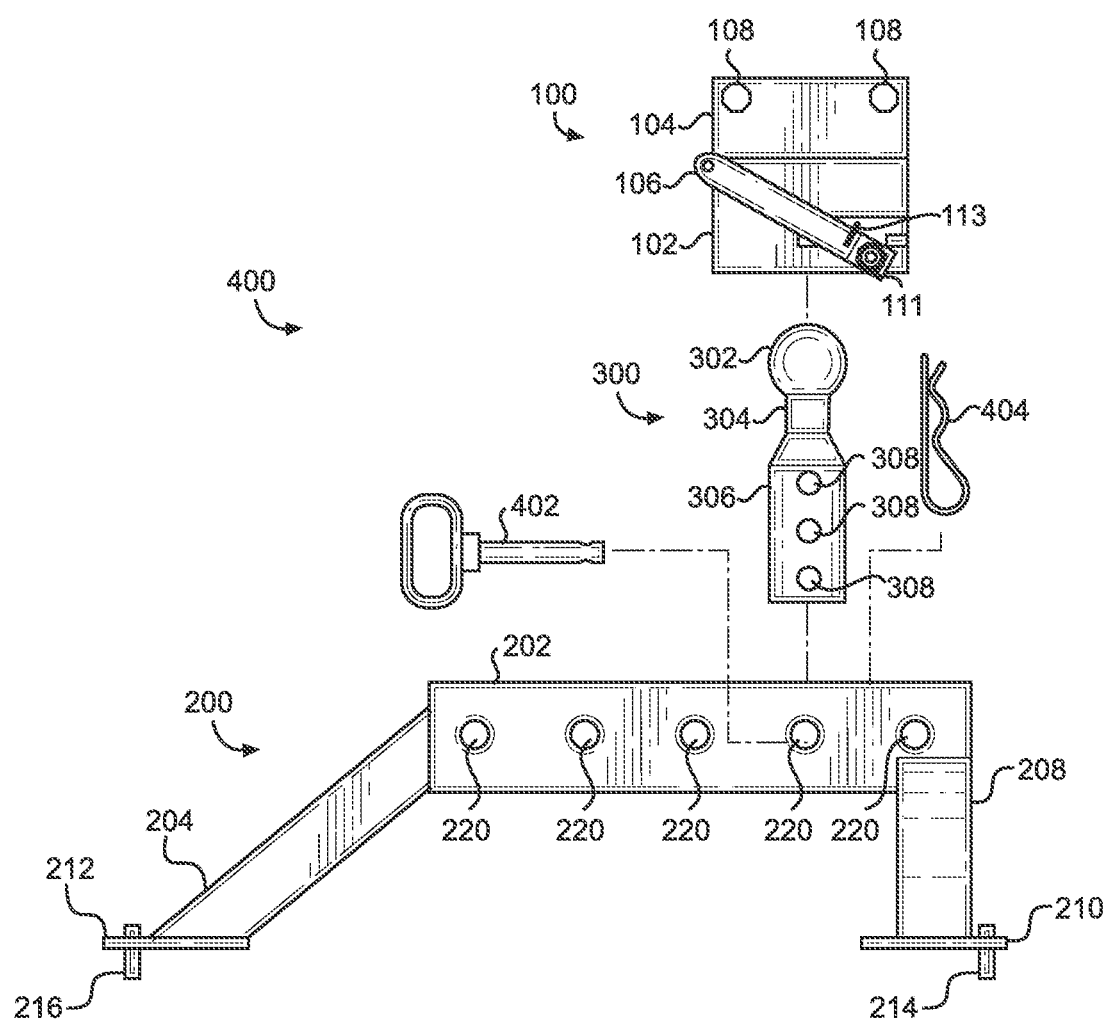
FIG. 18 is an exploded view of the king pin adaptor, hitch assembly, and ball according to a preferred embodiment of the instant invention.

FIG. 18 shows an exploded view of a towing system 400, which includes the king pin adaptor 100, the ball member 300, the hitch assembly 200, the pin 402, and clip 404. The king pin adaptor 100 is attachable to a king pin at one end and the ball member 300 at an opposite end. The ball member 300 is insertable into the hitch assembly 200 and securable therein by the pin 402. The clip 404 attaches to the pin 402 to prevent the pin from being removable from the pin holes 220 and opening 308 of the hitch assembly 200 and ball member 300, respectively. The embodiments of the king pin adaptor 100, hitch assembly 200, and ball member 300 shown in the towing system include the preferred embodiments of each referenced structure as previously discussed. Further embodiments of each referenced structure are also contemplated as being usable within the towing system 400.

Figure 19A:
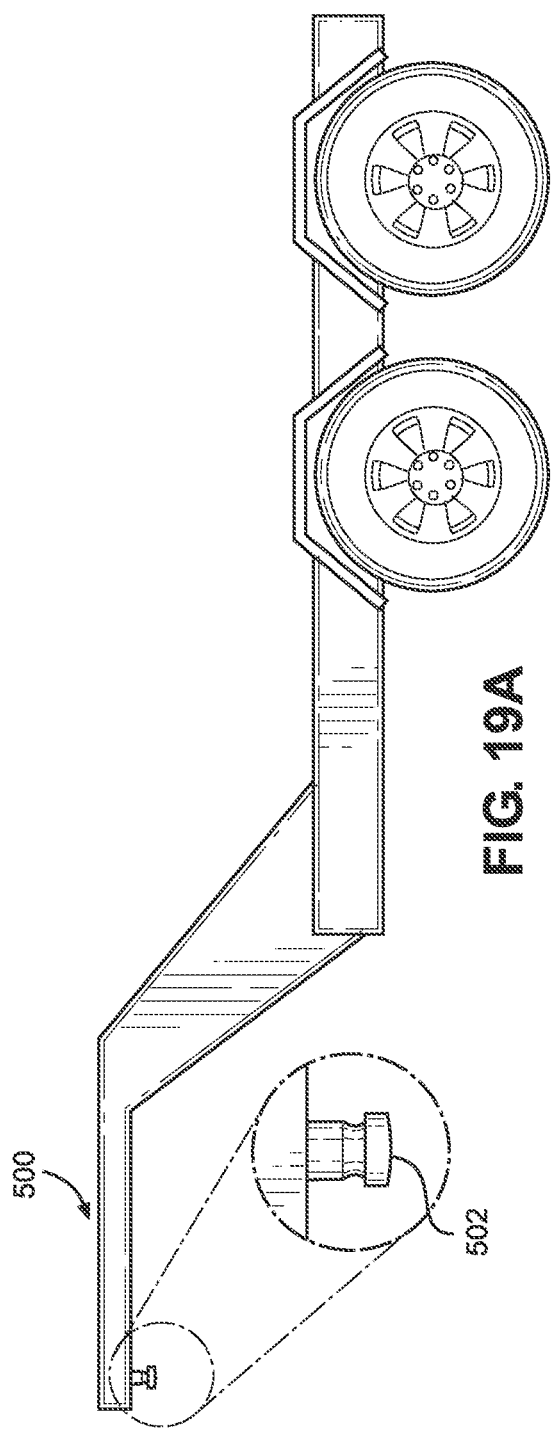
FIG. 19A is a magnified view of a king pin on an exemplary trailer.
Figure 19C:
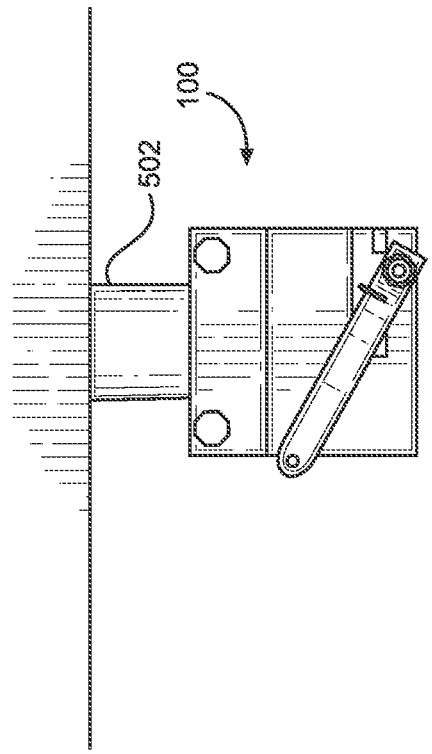
FIG. 19C is the king pin adaptor secured around the king pin of the exemplary trailer of FIG. 19A.
Figure 19B:
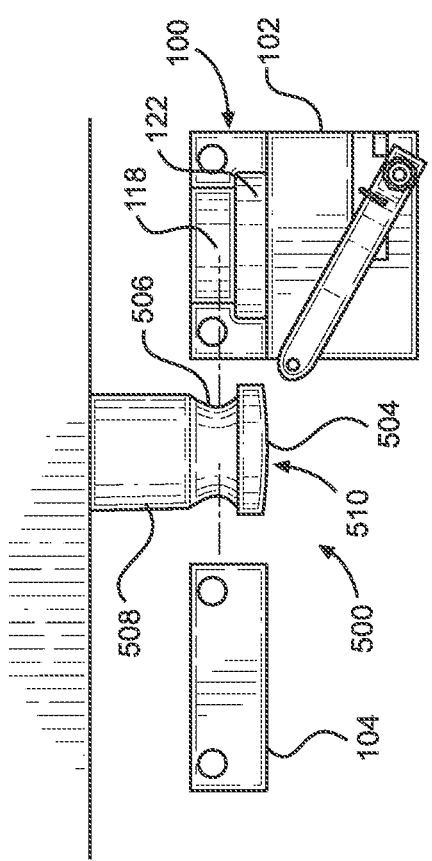
FIG. 19B is the king pin adaptor exploded around the king pin of the exemplary trailer of FIG. 19A.

FIGS. 19A-19C show an exemplary trailer 500 having a king pin 502, and the king pin adaptor 100 being attached thereto. The trailer 500 may include other typical structures that are towed behind an automotive vehicle. The trailer 500 shown in FIG. 19A is not shown to limit the instant invention and only serves as an example of a trailer that includes a king pin 502. The king pin 500 typically includes a head portion 504, a neck portion 506, and a body portion 508. All three portions 504, 506, and 508 are typically cylindrical or have circular cross-sections. The neck portion 506 may be a groove or indentation between the head portion 504 and the body portion 508. The neck portion 506 has a smaller diameter than either the head portion 504 or the body portion 508. The head portion 504 and body portion 508 may have the same diameter or may have different diameters.

The head portion 504 of a king pin 500 is typically flat along an end surface 510, or slightly curved if not completely flat. Unlike a ball member 300 attachment, a king pin 502 restricts rotation to a single plane, as rotation is meant to occur about the neck portion 506. The head portion 504 restricts three-dimensional rotation. Conversely, the spherical head 302 of the ball member 300 allows three-dimensional rotations. This is one of the desirable features that motivates attaching a king pin adaptor 100 to a king pin 502 in the instant invention.

In FIG. 19B, the plate 104 and housing 102 of the king pin adaptor 100 are shown separated and positioned around the king pin 502 of the trailer 500. When attached, as shown in FIG. 19C, the head portion 504 is secured between grooves 122 and 124 and the neck portion is secured between grooves 118 and 120, both the neck portion and the head portion being secured within chamber 136. Grooves 118 and 120 of the housing 102 and plate 104, respectively, along with horizontal surface 142 secure the king pin adaptor 100 to the king pin 502 to prevent lateral or longitudinal movement of the adaptor relative to the king pin. Only rotational movement of the king pin adaptor 100 about the king pin 502 is possible.

Figure 20:
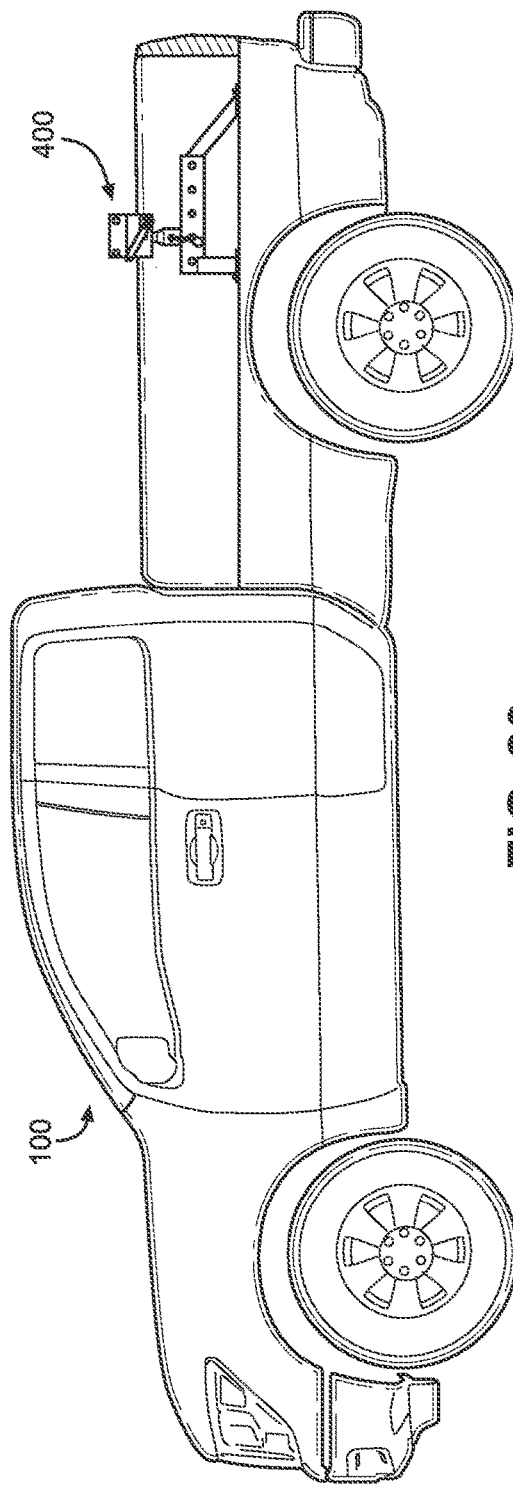
FIG. 20 is a side view of a towing system secured to a bed of a truck.

FIG. 20 shows an exemplary automotive vehicle 600, i.e. a pickup truck, with a cross-sectional view of a bed of the truck to which the hitch assembly 200 of the towing system 400 of the instant invention is attached. Attachment of the towing system 400 to a vehicle, and more particularly the hitch assembly 200, is performed in a manner known in the field for attaching hitches to truck or similar automotive vehicle typically used to tow trailers.

Figure 21:
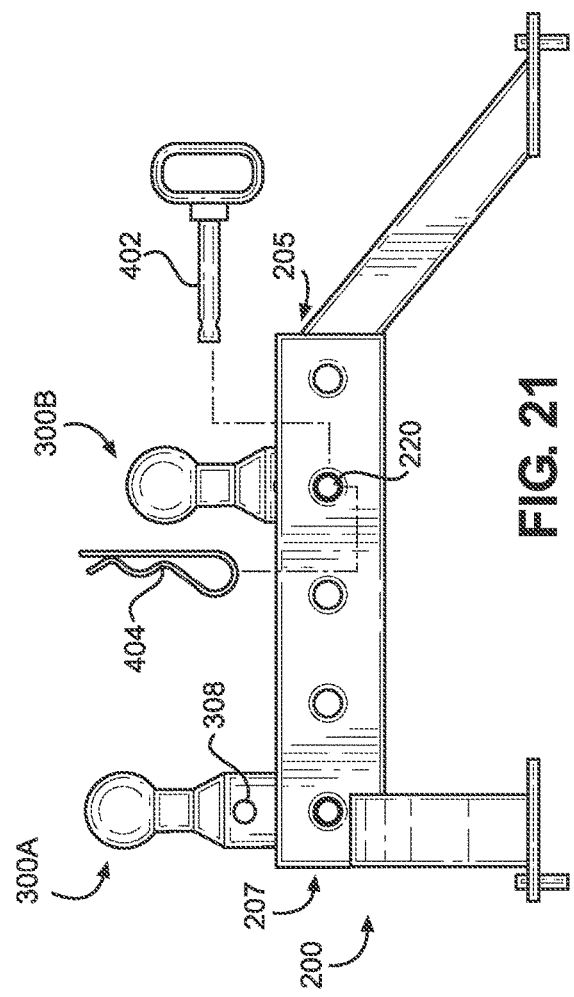
FIG. 21 is a side view of the hitch assembly with the ball shown secured along two different longitudinal vertical positions.

FIG. 21 provides an exemplary illustration of the ball member 300 positioned at different vertical and horizontal positions relative to the hitch assembly. Ball member 300A is positioned in a cylindrical chamber 218 closest to a back end 207 of the body 202 and the pin 402 would be inserted through a bottom opening 308 of the ball member 300A. Ball member 300B is positioned in the cylindrical chamber 218 second-closest to the front end 205 of the body 202. The pin 402 would be inserted through a middle opening 308 of the ball member 300B. For either ball member 300A or 300B, the pin would be inserted through the pair of pin holes 220 of the body 202 and through the corresponding opening 308, and the clip 404 would be inserted through a hole in a free end of the pin to prevent the pin 402 from being removed in a direction opposite to a direction of insertion.

Figure 22:
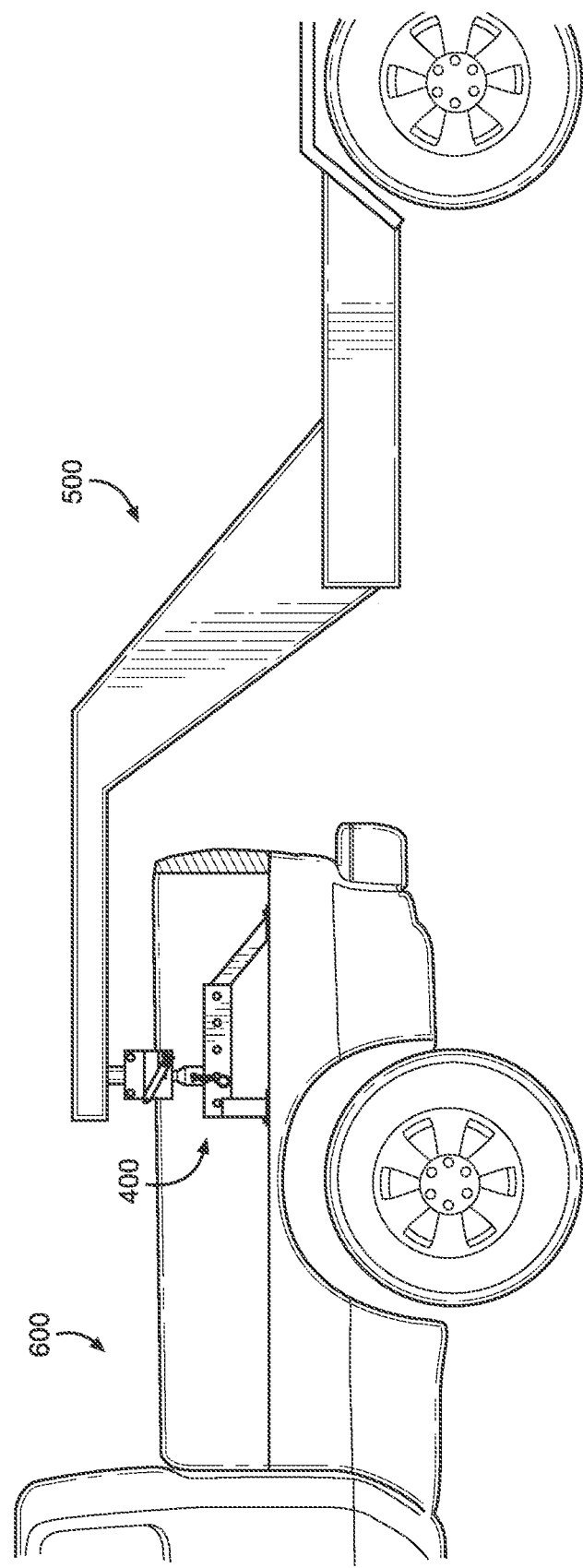
FIG. 22 is a view of the towing system attached to a truck and trailer, including the king pin adaptor, hitch assembly, and ball.

FIG. 22 illustrates the vehicle 600 connected to the trailer 500 via the towing system 400.

The invention claimed is:

1. A hitch assembly, comprising:
an elongated body having a plurality of cylindrical chambers spaced longitudinally along the body, each chamber open along a top surface of the body, and a pair of corresponding pin holes laterally bisecting the body through each cylindrical chamber;
at least one front leg secured to a front end of the body; and
at least one back leg secured to a back end of the body, wherein the at least one front leg and at least one back leg are securable to a vehicle.

2. The hitch assembly of claim 1, wherein a stabilizer plate connects the at least one front leg to the vehicle.

3. The hitch assembly of claim 2, wherein the stabilizer plate and the at least one front leg are securable to the vehicle.

4. The hitch assembly of claim 1, wherein a stabilizer plate connects the at least one back leg to the vehicle.

5. The hitch assembly of claim 4, wherein the stabilizer plate and the at least one back leg are securable to the vehicle.

6. The hitch assembly of claim 1, wherein the plurality of cylindrical chambers includes five cylindrical chambers.

7. The hitch assembly of claim 1, further comprising a ball member having a cylindrical stabilizer portion and a spherical connector portion connected vertically by a grooved segment, wherein the cylindrical stabilizer portion has a plurality of vertically spaced horizontal channels, each horizontal channel laterally bisecting the cylindrical stabilizer portion.

8. The hitch assembly of claim 7, wherein the ball member is removably securable with each cylindrical chamber of the body along the cylindrical stabilizer portion.

9. The hitch assembly of claim 8, further comprising a pin configured to be removably insertable through the pair of corresponding pin holes laterally bisecting the body and any of the plurality of vertically spaced horizontal channels, thereby removably securing the ball member along multiple vertical and horizontal positions relative to the body.

* * * * *